US011030167B2

(12) United States Patent
Nath et al.

(10) Patent No.: US 11,030,167 B2
(45) Date of Patent: *Jun. 8, 2021

(54) SYSTEMS AND METHODS FOR PROVIDING DATA QUALITY MANAGEMENT

(71) Applicant: Capital One Services, LLC, McLean, VA (US)

(72) Inventors: Yatindra Nath, Bangalore (IN); Ankur Garg, Bangalore (IN); Rajeev Tiwari, Bangalore (IN); Pranav Vrat, Bangalore (IN); Amit Mohanty, Bangalore (IN)

(73) Assignee: Capital One Services, LLC, McLean, VA (US)

(*) Notice: Subject to any disclaimer, the term of this patent is extended or adjusted under 35 U.S.C. 154(b) by 216 days.

This patent is subject to a terminal disclaimer.

(21) Appl. No.: 16/252,024

(22) Filed: Jan. 18, 2019

(65) Prior Publication Data

US 2019/0155797 A1    May 23, 2019

Related U.S. Application Data

(63) Continuation of application No. 15/847,674, filed on Dec. 19, 2017, now Pat. No. 10,185,728.
(Continued)

(51) Int. Cl.
*G06F 16/215*    (2019.01)
*G06N 5/02*    (2006.01)
(Continued)

(52) U.S. Cl.
CPC .......... *G06F 16/215* (2019.01); *G06F 16/122* (2019.01); *G06F 16/2365* (2019.01);
(Continued)

(58) Field of Classification Search
CPC .. G06F 16/215; G06F 16/122; G06F 16/2365; G06N 5/025; G06N 20/00
(Continued)

(56) References Cited

U.S. PATENT DOCUMENTS 5,032,978 A * 7/1991 Watson .............. G05B 23/0227
700/83
7,050,933 B2    5/2006 Parvin et al.
(Continued)

OTHER PUBLICATIONS

Yakout et al., "GDR: A System for Guided Data Repair", in Proceedings of SIGMOD Conference, Jun. 6-11, 2010, Indianapolis, Indiana, USA, pp. 1223-1225. (Year: 2010).*
(Continued)

*Primary Examiner* — Phuong Thao Cao
(74) *Attorney, Agent, or Firm* — Pillsbury Winthrop Shaw Pittman LLP

(57) ABSTRACT

A system for providing data quality management may include a processor configured to execute instructions to: extract a plurality of first data elements from a data source; generate a data profile based on the first data elements; automatically create a first set of rules based on the first data elements and the data profile, the first set of rules assessing data quality according to a threshold; generate a second set of rules based on the first data elements and the first set of rules; extract a plurality of second data elements; assess the second data elements based on a comparison of the second data elements to the second set of rules; detect defects based on the comparison; analyze data quality according to the detected defects; and transmit signals representing the data quality analysis to a client device for display to a user.

20 Claims, 11 Drawing Sheets

Related U.S. Application Data

(60) Provisional application No. 62/436,258, filed on Dec. 19, 2016.

(51) Int. Cl.
*G06F 16/48* (2019.01)
*G06F 16/11* (2019.01)
*G06F 16/23* (2019.01)
*G06N 20/00* (2019.01)

(52) U.S. Cl.
CPC ............. *G06F 16/48* (2019.01); *G06N 5/025* (2013.01); *G06N 20/00* (2019.01)

(58) Field of Classification Search
USPC ........................................................ 707/692
See application file for complete search history.

(56) References Cited

U.S. PATENT DOCUMENTS

| | | |
|---|---|---|
| 7,286,957 B2 | 10/2007 | Parvin et al. |
| 7,620,888 B2 | 11/2009 | Hirst |
| 7,711,660 B1 | 5/2010 | Gentile et al. |
| 7,885,915 B2 | 2/2011 | Parson et al. |
| 8,250,008 B1 | 8/2012 | Cao et al. |
| 8,417,654 B1 | 4/2013 | Cao et al. |
| 8,515,863 B1* | 8/2013 | Morejon ................ G06Q 40/02 705/38 |
| 8,700,577 B2* | 4/2014 | Yeh ................... G06F 16/24565 707/692 |
| 8,849,736 B2 | 9/2014 | Miranda et al. |
| 8,949,158 B2* | 2/2015 | Borthwick ............. G06N 7/005 706/12 |
| 9,158,805 B1* | 10/2015 | Kalki .................. G06F 16/2365 |
| 9,529,851 B1 | 12/2016 | Smith |
| 9,652,489 B2 | 5/2017 | Vijayasekaran et al. |
| 10,127,264 B1* | 11/2018 | Pyle .................... G06F 16/2365 |
| 10,877,955 B2* | 12/2020 | Derstadt ............. G06F 16/2365 |
| 2003/0228049 A1 | 12/2003 | Asai |
| 2004/0218806 A1* | 11/2004 | Miyamoto ............ G06T 7/0004 382/145 |
| 2006/0020641 A1 | 1/2006 | Walsh et al. |
| 2006/0173924 A1 | 8/2006 | Wotton et al. |
| 2007/0027674 A1* | 2/2007 | Parson .................. G06F 40/211 704/9 |
| 2007/0061393 A1* | 3/2007 | Moore .................. G06F 16/958 709/201 |
| 2007/0156749 A1 | 7/2007 | Levin |
| 2007/0198213 A1 | 8/2007 | Parvin et al. |
| 2007/0219820 A1 | 9/2007 | Busch |
| 2008/0071465 A1* | 3/2008 | Chapman ........... G01C 21/3691 701/117 |
| 2008/0097789 A1 | 4/2008 | Huffer |
| 2008/0317329 A1 | 12/2008 | Shibuya et al. |
| 2009/0199052 A1 | 8/2009 | Yamaguchi et al. |
| 2010/0299314 A1 | 11/2010 | Sengupta et al. |
| 2011/0055799 A1 | 3/2011 | Kaulgud et al. |
| 2011/0138312 A1 | 6/2011 | Yeh et al. |
| 2012/0053959 A1 | 3/2012 | Sengupta et al. |
| 2012/0072464 A1 | 3/2012 | Cohen |
| 2012/0123994 A1 | 5/2012 | Lowry et al. |
| 2012/0149339 A1 | 6/2012 | Mulampaka et al. |
| 2012/0150825 A1 | 6/2012 | Chaturvedi et al. |
| 2012/0179658 A1 | 7/2012 | Chaturvedi et al. |
| 2012/0259898 A1 | 10/2012 | Sengupta et al. |
| 2012/0296879 A1* | 11/2012 | Yakout ................. G06F 16/215 707/691 |
| 2013/0007629 A1 | 1/2013 | Dani et al. |
| 2013/0031044 A1 | 1/2013 | Miranda et al. |
| 2013/0055042 A1* | 2/2013 | Al Za'noun ..... G06Q 10/06395 714/746 |
| 2013/0073594 A1* | 3/2013 | Jugulum ................ G06Q 40/00 707/802 |
| 2013/0166515 A1 | 6/2013 | Kung et al. |
| 2013/0185309 A1 | 7/2013 | Bhide et al. |
| 2014/0195396 A1 | 7/2014 | Bhakta et al. |
| 2014/0212022 A1* | 7/2014 | Geshel .................... G06T 7/001 382/149 |
| 2014/0279934 A1 | 9/2014 | Li et al. |
| 2014/0297584 A1 | 10/2014 | Jenkins et al. |
| 2014/0324801 A1 | 10/2014 | McGraw et al. |
| 2014/0324871 A1* | 10/2014 | Ray ........................ G06F 16/35 707/740 |
| 2015/0019472 A1 | 1/2015 | Miranda et al. |
| 2015/0081614 A1 | 3/2015 | Bechet et al. |
| 2015/0125064 A1 | 5/2015 | Chen et al. |
| 2015/0134591 A1 | 5/2015 | Staeben et al. |
| 2015/0310055 A1* | 10/2015 | Derstadt ............. G06F 16/2365 707/687 |
| 2015/0310132 A1 | 10/2015 | Derstadt |
| 2016/0063049 A1 | 3/2016 | Vijayasekaran et al. |
| 2016/0063441 A1 | 3/2016 | Kamat et al. |
| 2016/0070724 A1 | 3/2016 | Marrelli et al. |
| 2016/0070725 A1 | 3/2016 | Marrelli et al. |
| 2016/0092290 A1* | 3/2016 | Gerstl .................. G06F 11/079 714/37 |
| 2016/0162507 A1 | 6/2016 | Gupta et al. |
| 2016/0178414 A1 | 6/2016 | Saha et al. |
| 2016/0187146 A1 | 6/2016 | He et al. |
| 2016/0307133 A1* | 10/2016 | Kour ................. G06Q 10/06313 |
| 2016/0342755 A1 | 11/2016 | Yom-Tov et al. |
| 2016/0350950 A1 | 12/2016 | Ritchie et al. |
| 2016/0358041 A1* | 12/2016 | Venkataraman ........ H01L 22/00 |
| 2016/0364325 A1 | 12/2016 | Ouzzani et al. |
| 2016/0364434 A1 | 12/2016 | Spitz et al. |
| 2016/0364648 A1 | 12/2016 | Du et al. |
| 2017/0004413 A1 | 1/2017 | Flores et al. |
| 2017/0004414 A1* | 1/2017 | Flores .................. G06N 3/0445 |
| 2017/0091570 A1 | 3/2017 | Rao et al. |
| 2017/0103101 A1 | 4/2017 | Mason |
| 2017/0103517 A1* | 4/2017 | Kurada ................. G01N 21/956 |
| 2017/0242897 A1 | 8/2017 | Kephart et al. |
| 2017/0243117 A1 | 8/2017 | Kephart et al. |
| 2017/0351991 A1 | 12/2017 | Halberstadt et al. |
| 2017/0371768 A1 | 12/2017 | Iyer et al. |
| 2017/0372232 A1 | 12/2017 | Maughan et al. |
| 2018/0068195 A1 | 3/2018 | Kolarov et al. |
| 2018/0089227 A1* | 3/2018 | Reddy ................ G01C 21/3605 |
| 2018/0137148 A1 | 5/2018 | Kabra et al. |
| 2018/0144067 A1* | 5/2018 | Chatelain .............. G06F 16/907 |
| 2018/0144314 A1 | 5/2018 | Miller |
| 2018/0173212 A1 | 6/2018 | Poh et al. |
| 2018/0173733 A1 | 6/2018 | Nath et al. |
| 2018/0373579 A1* | 12/2018 | Rathore .................. G06F 17/18 |

OTHER PUBLICATIONS

Al par et al., "Assessment of Data Quality in Accounting Data with Association Rules", Expert Systems with Applications, vol. 41, Issue 5, Apr. 2014, pp. 2259-2268. (Year: 2014).

Chiang et al., "Discovering Data Quality Rules", in Proceedings of the VLDB Endowment, vol. 1, Issue 1, Aug. 2008, pp. 1166-1177. (Year: 2008).

Tseng et al., "A Minimal Perfect Hashing Scheme to Mining Association Rules from Frequently Updated Data", Journal of the Chinese Institute of Engineers, vol. 29, No. 3, 2006, pp. 391-401. (Year: 2006).

Yeh et al., "An Efficient and Robust Approach for Discovering Data Quality Rules", in Proceedings of the 2010 22nd International Conference on Tools with Artificial Intelligence, 2010, pp. 248-255. (Year: 2010).

* cited by examiner

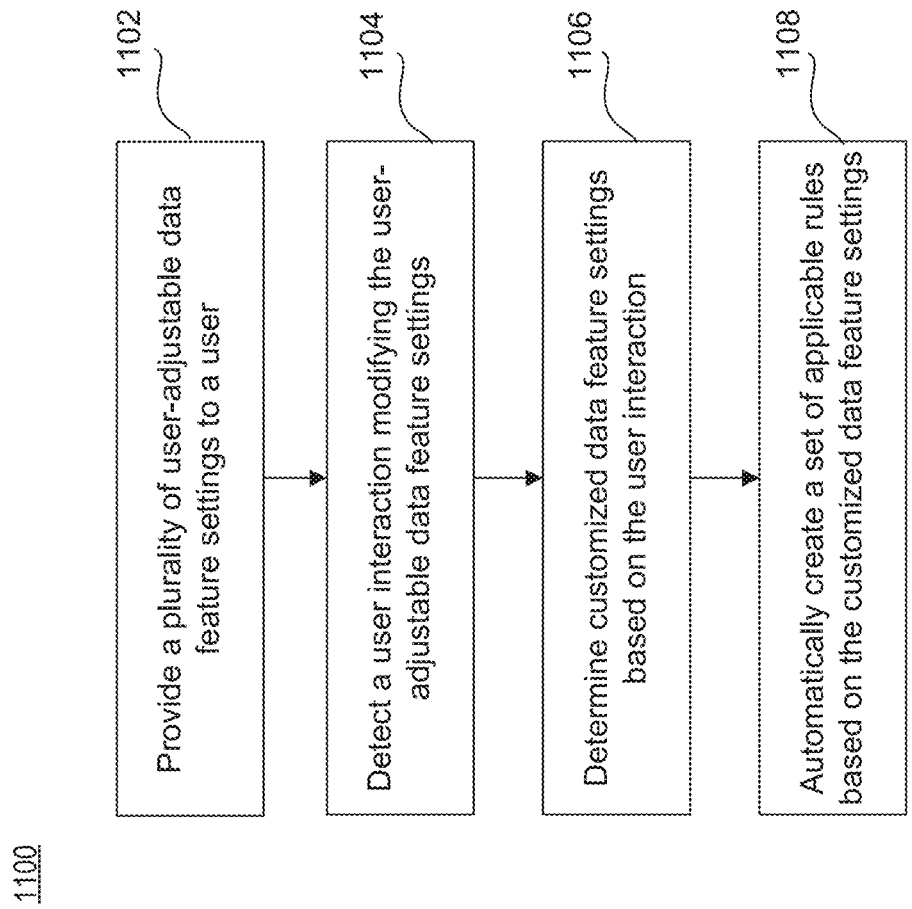

SYSTEMS AND METHODS FOR PROVIDING DATA QUALITY MANAGEMENT

CROSS-REFERENCE TO RELATED APPLICATIONS

This application is a continuation of U.S. application Ser. No. 15/847,674 (now patented as U.S. Pat. No. 10,185,728), filed Dec. 19, 2017, which claims priority to U.S. Provisional Patent Application Ser. No. 62/436,258, filed Dec. 19, 2016, the contents of both of which are hereby incorporated by reference in their entireties.

TECHNICAL FIELD

The present disclosure generally relates to providing improved data quality management solutions for organizations, and more specifically, to developing automated and contingent rule-making processes to assess data quality for use in organizational decision making.

BACKGROUND

An organization may wish to collect, store, monitor, and analyze data. As the amount of data grows, data amalgamation mechanisms are increasingly relied upon in order to form organizational and corporate strategic decisions. While current data assembly mechanisms may allow for collection of raw data, there exist some shortcomings. For example, collected raw data may not be readily usable, and may need to be modified or summarized prior to analysis or synthesis. Moreover, collected data may constitute low quality data, and errors may occur during collection and/or transformation of data. For example, errors related to data quality may include incomplete data (where data has not been pulled from one source), incorrect transformations to a data element, wrong manual entry of the data, and errors in calculations. Further, at present it is difficult to assess data quality for a large dataset and focus is usually on individual tables of data. With such errors, difficulties in assessment, and without such transformation, premature use of data for analysis may cause poor organizational decision-making resulting in significant monetary costs and reputational damage to a company.

Furthermore, while current data quality tools allow for processing of significant amounts of data, existing tools may not provide comprehensive means for data exploration and monitoring. For example, some data platforms may be used solely to execute processes related to collection at the individual dataset level, while other tools may be used solely to execute processes related to data tracking. Additionally, many data quality tools require manual implementation, which may be tiresome and burdensome to operate since there exists no standardized procedure. Use of disaggregated and manual data collection mechanisms across multiple platforms may also result in tedious or erroneous data analysis. Furthermore, where data monitoring for a large number of variables is required, use of existing data quality tools may require significant human capital over a long period of time and at significant cost to an organization.

Accordingly, it may be desirable to provide a standard data quality process or rule-based workflow implementable within a singular platform. This process may significantly distinguish from or improve over a manual process. For example, where an example variable is an annual percentage rate (APR), manual rules may check whether the contract APR is a number and whether it is greater than zero. However, the enhanced process described herein may include the creation of suggested rules, including not only a rule to check whether contract APR is a number greater than zero, but also including a rule indicating that the contract APR should not be missing if the contract is finalized. This rule provides a further check, thus improving data quality over that of manual rule implementation. This provides an improvement in data quality and an efficiency gain.

Additionally, an automated end-to-end data application may be preferable in order to allow for streamlined data procurement, analysis using consistent metrics, and monitoring. Moreover, there exists a need for a user-intuitive point-and-click interface allowing for rapid and efficient monitoring and exploration of significant quantities of data sets and elements. Further, there exists a need for a comprehensive data tool which allows a user to perform diagnosis of data quality directly within the data tool. Current platforms are inefficient, difficult, or even impossible, thus requiring excess operator time and processing resources. Further, typical processes for managing data quality are subjective and not automated. Such processes are time- and resource-consuming. Therefore, it is desirable to implement a distinctly computer-implemented and enhanced automated process which improves the management of data quality.

The present disclosure is directed at addressing one or more of the shortcomings set forth above and/or other problems of existing hardware systems.

SUMMARY

One aspect of the present disclosure is directed to a system for providing data quality management. The system may include a memory storing instructions, and a processor connected to a network. The processor is configured to execute the instructions to: extract a plurality of first data elements from a data source; generate a data profile based on the first data elements; automatically create a first set of rules based on the first data elements and the data profile, the first set of rules assessing data quality according to a threshold; generate a second set of rules based on the first data elements and the first set of rules; extract a plurality of second data elements; assess the second data elements based on a comparison of the second data elements to the second set of rules; detect defects based on the comparison; analyze data quality according to the detected defects; and transmit signals representing the data quality analysis to a client device for display to a user.

Another aspect of the present disclosure is directed to a method for providing data quality management. The method may be performed by a processor, and may include: extracting a plurality of first data elements from a data source; generating a data profile based on the first data elements; automatically creating a first set of rules based on the first data elements and the data profile, the first set of rules assessing data quality according to a threshold; generating a second set of rules based on the first data elements and the first set of rules; extracting a plurality of second data elements; assessing the second data elements based on a comparison of the second data elements to the second set of rules; detecting defects based on the comparison; analyzing data quality according to the detected defects; and transmitting signals representing the data quality analysis to a client device for display to a user.

Another aspect of the present disclosure is directed to a non-transitory computer-readable medium for providing data quality management. The non-transitory computer-readable medium may store instructions executable by one or more processors to perform a method. The method may include: extracting a plurality of first data elements from a data source; generating a data profile based on the first data elements; automatically creating a first set of rules based on the first data elements and the data profile, the first set of rules assessing data quality according to a threshold; generating a second set of rules based on the first data elements and the first set of rules; extracting a plurality of second data elements; assessing the second data elements based on a comparison of the second data elements to the second set of rules; detecting defects based on the comparison; analyzing data quality according to the detected defects; and transmitting signals representing the data quality analysis to a client device for display to a user.

Another aspect of the present disclosure is directed to a system for providing data quality management. The system includes a graphic user interface (GUI) configured to: display a plurality of user-adjustable data feature settings to a user; and detect a first user interaction modifying the data feature settings. The system also includes a processor coupled to the GUI and configured to: extract a plurality of first data elements from a data source; generate a data profile based on the first data elements; determine first data feature settings based on the first user interaction; and create a first set of rules based on the first data feature settings, the first set of rules assessing quality of the first data elements according to a threshold.

Another aspect of the present disclosure is directed to a method for providing data quality management. The method includes: displaying, on a graphic user interface (GUI), a plurality of user-adjustable data feature settings to a user; detecting, from the GUI, a first user interaction modifying the data feature settings; extracting, by a processor coupled to the GUI, a plurality of first data elements from a data source; generating, by the processor, a data profile based on the first data elements; determining, by the processor, first data feature settings based on the first user interaction; and creating, by the processor, a first set of rules based on the first data feature settings, the first set of rules assessing quality of the first data elements according to a threshold.

Yet another aspect of the present disclosure is directed to a non-transitory computer-readable medium storing instructions executable by a processor to provide a graphic user interface (GUI) and perform a method for providing data quality management. The method comprising: displaying, on the GUI, a plurality of user-adjustable data feature settings to a user; detecting, from the GUI, a first user interaction modifying the data feature settings; extracting, by a processor coupled to the GUI, a plurality of first data elements from a data source; generating, by the processor, a data profile based on the first data elements; determining, by the processor, first data feature settings based on the first user interaction; and creating, by the processor, a first set of rules based on the first data feature settings, the first set of rules assessing quality of the first data elements according to a threshold.

BRIEF DESCRIPTION OF THE DRAWINGS

FIG. 11 is a flow chart illustrating another exemplary process performed by the system in FIG. 1, in accordance with the disclosed embodiments.

DETAILED DESCRIPTION

Figure 1:
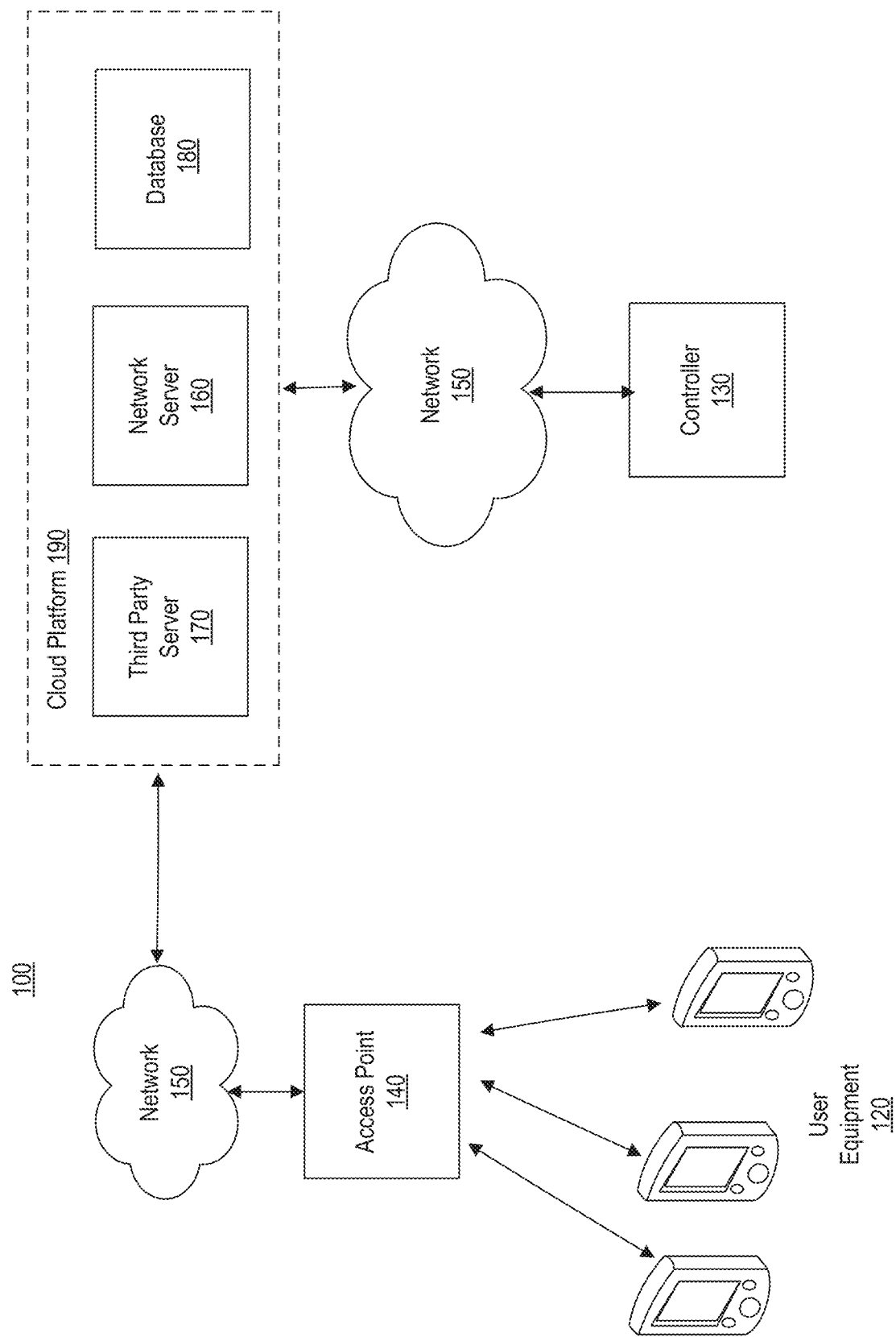
FIG. 1 is a schematic block diagram illustrating an exemplary system for providing data quality management, consistent with the disclosed embodiments.

The following detailed description refers to the accompanying drawings. Wherever possible, the same reference numbers are used in the drawings and in the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 is a schematic block diagram illustrating an exemplary embodiment for providing data quality management, consistent with the disclosed embodiments. As illustrated in FIG. 1, system 100 may include one or more personal devices and/or user equipment 120, a controller 130, and a network 150.

Personal devices 120 may include personal computing devices such as, for example, desktop computers, notebook computers, mobile devices, tablets, smartphones, wearable devices such as smart watch, smart bracelet, and Google Glass™, and any other personal devices. Personal devices 120 may communicate with other parts of system 100 through network 150. Personal devices 120 may also include software and executable programs configured to communicate with network 150 and customize data quality management for one or more users monitoring and configuring data quality. Other software and executable programs are contemplated.

System 100 may allow for one or more personal devices 120 and/or controllers 130 to transfer representative data profiles, historical data, metadata, and customized user-adjustable data quality management features associated with a data quality application (e.g., illustrated in FIGS. 4-9) over network 150 to a cloud platform 190 and/or controller 130. System 100 may include mobile or stationary (not shown) personal devices 120 located in residential premises and non-residential premises configured to communicate with network 150. Personal devices 120 and/or controller 130 may connect to network 150 by Wi-Fi or wireless access points (WAP). Bluetooth® or similar wireless technology may be contemplated. Network 150 may include a wireless network, such as a cellular network, a satellite network, the Internet, or a combination of these (or other) networks that are used to transport data. Furthermore, network 150 may be a wired network, such as an Ethernet network. Network 150 may transmit, for example, authentication services that enable personal devices 120 and/or controller 130 to access information, and may transmit data quality management instructions according to a representative profile data, created rule data, segment or cluster data, and associated metadata.

In exemplary system 100, personal devices 120 and controller 130 may communicate with one or more servers in cloud platform 190 through network 150. Cloud platform 190 may comprise one or more network servers 160, third party servers 170, and/or databases 180. Servers 160 and 170 may provide cloud services for users and their personal devices 120 and/or controller 130. For example, a cloud-based architecture may be implemented comprising a distributed portion that executes at another location in network 150 and a corresponding cloud portion that executes on a network server 160 in cloud platform 190. Servers in cloud platform 190 may also communicate with a transceiver of controller 130 over network 150 using appropriate cloud-based communication protocols, such as Simple Object Access Protocol (SOAP) or Representational State Transfer (REST) and/or other protocols that would be known to those skilled in the art. Such communication may allow for remote control of data quality management operations of controller 130 by, for example, by identifying representative data profiles and data quality preferences associated with the identified data profiles. Such communication may also allow for remote control of data quality management monitoring operations by, for example, a user operating a GUI on a data quality management application executed on a personal device 120 and/or on controller 130 to configure user-adjustable data feature settings or monitor related variables.

As shown in FIG. 1, network 150 may be accessible to network servers 160, third party servers 170, and databases 180 in cloud platform 190, for sending and receiving information, such as profile data, rule data, and segment data, within system 100. Network server 160, third party server 170, and database 180 may include network, cloud, and/or backup services. For example, in some embodiments, network server 160 may include a cloud computing service such as Microsoft Azure or Amazon Web Services Additional cloud-based wireless access solutions compatible with LTE (e.g., using the 3.5 GHz spectrum in the US) are contemplated. In some embodiments, third party server 170 may include a messaging or notification service, for example, that may notify or alert a monitoring user of at least one rule update through the cloud network. A selected rule from a set of applicable rules may be updated and may include at least one of a null rule, a range rule, a uniqueness rule, a valid value rule, a format rule, a conditional rule, or a consistency rule, but other rule types are contemplated. A conditional rule (if A, then B) may flag accounts as defective if a variable is missing as the variable cannot be missing if a certain condition is fulfilled. For example, where a variable is "Contract APR" and where a fulfilled condition is exemplified by an "offer type code" equaling a "finalized contract," the variable of "Contract APR" cannot be designated as missing upon the "offer type code" equaling a "finalized contract." A consistency rule may include a mathematical or correlational check (e.g. A=B+C where A, B, and C are variables, or when A increases B also increases). A more complete description of "rules" will be set forth below.

Figure 2:
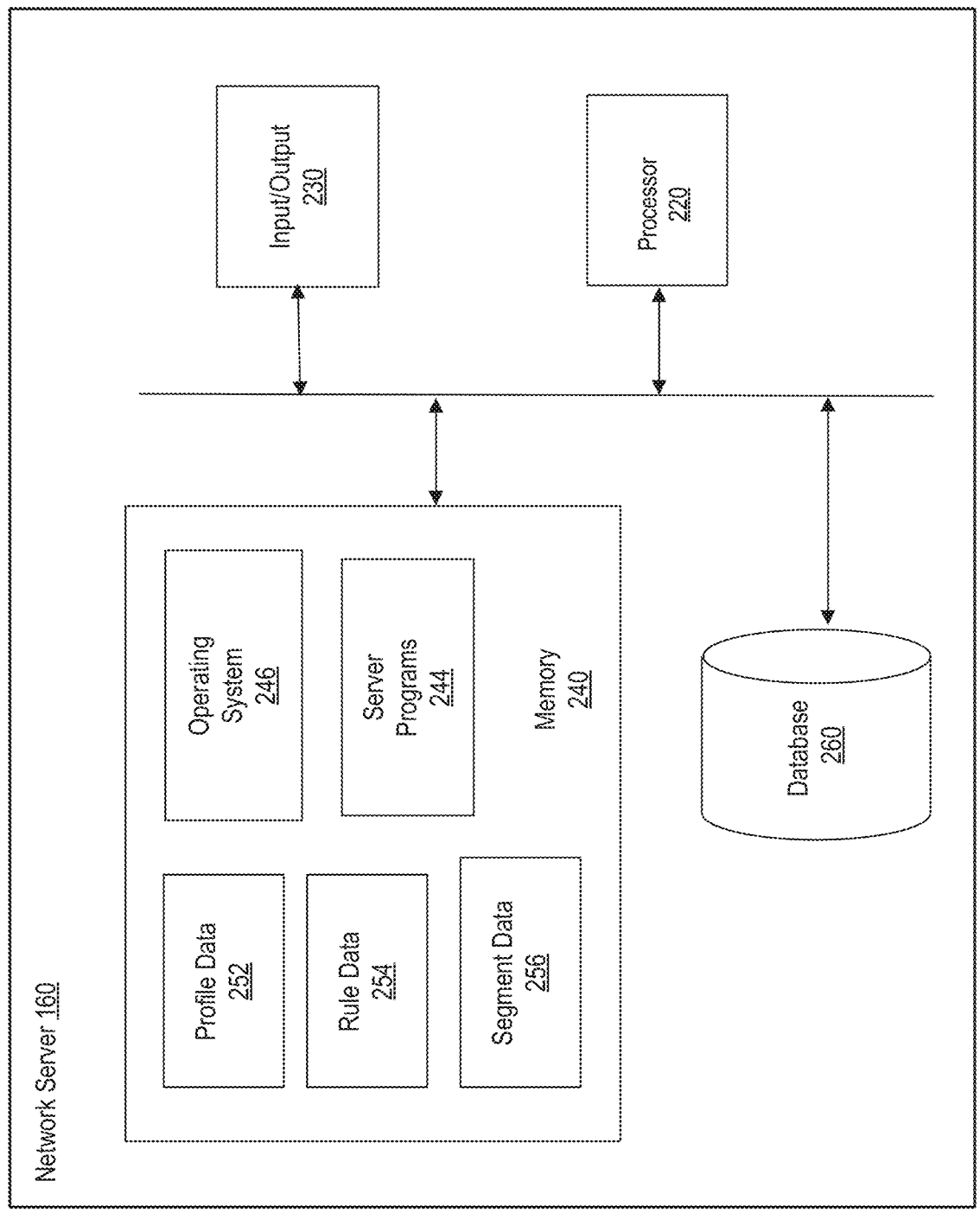
FIG. 2 is a schematic block diagram illustrating an exemplary network server, used in the system of FIG. 1.

FIG. 2 is a schematic block diagram illustrating an exemplary network server 160, used in the exemplary system 100 of FIG. 1. It is contemplated that one or more personal devices 120 may include similar structures described in connection with network server 160. As shown in FIG. 2, network server 160 may include, among other things, a processor 220, personal/output (I/O) devices 230, a memory 240, and a database 260, each coupled to one or more interconnected internal buses (not shown). Memory 240 may store among other things, server programs 244 and an operating system 246. Server programs 244 may be executed by cloud-based architecture or, alternatively, by a separate software program, such as a data quality management application (as further described with reference to FIGS. 4-9) for execution on personal device 120 and/or controller 130. Software program 244 may be located in personal devices 120, or in alternative embodiments, in a controller 130 (as described with reference to FIG. 3). Software program 244 may configure remote control and update of user-adjustable data feature settings according to existing profile data, rule data, and segment data.

Memory 240 and/or database 260 may store profile data 252 based on individual and/or aggregate data profile behavior. Profile data 252 may be input directly or manually by a user into a data quality management application that is executed on a personal device 120 and/or by a controller 130. Profile data 252 may also be automatically generated based on extracted data elements. Memory 240 may also store other data and programs. Profile data 252 may include representative data profiles related to organizational information including, for example, affiliated user login and/or other registration identification (ID) or user credentials, authentication timestamp information, network node or access point location(s) and/or preferences, and other metadata generated by algorithms in server programs 244. Other data critical to an organization's mission is also contemplated as profile data 252. Memory 240 and/or database 260 may also store rule data 254 and segment data 256. Rule data 254 and segment data 256 may be directly and manually input to a data quality management application that is executed on a personal device 120 and/or controller 130.

Alternatively, rule data 254 and segment data 256 may be automatically generated based on extracted data elements and profile data 252, historical data, or other metadata. Rule data 254 may include assessment of data quality according to a determined threshold, and may include data related to at least one of a null rule, range rule, uniqueness rule, valid value rule, format rule, conditional rule, or consistency rule. Rule data 254 may further include data related to a support value, a confidence value, and a lift ratio. Segment data 256 may include data-defining generated clusters based on detection of defects in extracted data elements. Data may be transformed using a general cluster computing system such as Spark™, and data may be extracted according to utilities, including third-party platforms.

Database 260 may include Microsoft SQL™ databases, SharePoint™ databases, Oracle™ databases, Sybase™ databases, or other relational databases. Memory 240 and database 260 may be implemented using any volatile or non-volatile memory including, for example, magnetic, semiconductor, tape, optical, removable, non-removable, or any other types of storage devices or computer-readable mediums.

Figure 3:
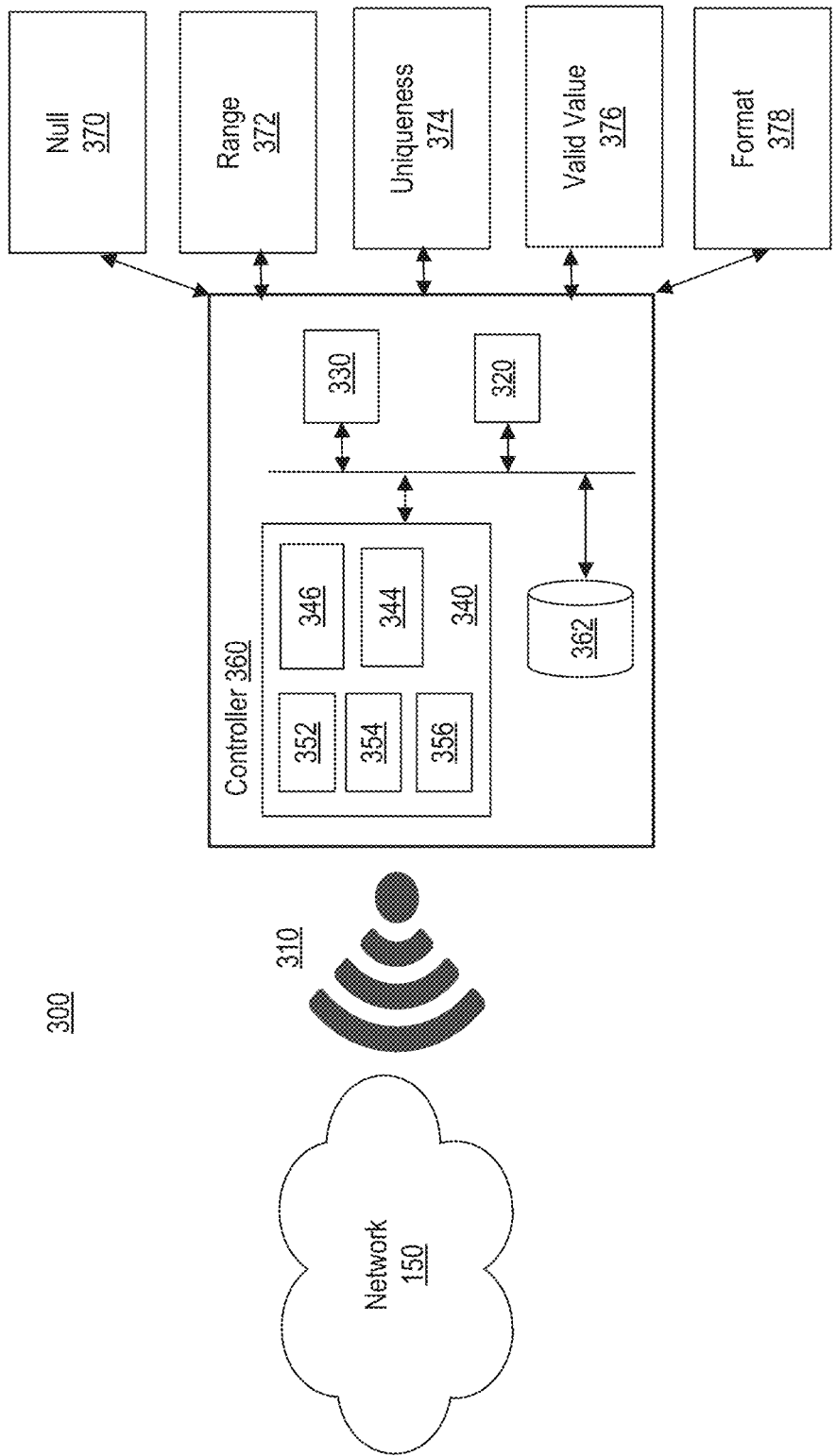
FIG. 3 is a schematic block diagram illustrating an exemplary controller, used in the system of FIG. 1.

I/O interfaces 230 may include not only network interface devices, but also user interface devices, such as one or more keyboards, mouse devices, and GUIs for interaction with personal devices 120 and/or by controller 130. For example, GUIs may include a touch screen where a monitoring user may use his fingers to provide input, or a screen that can detect the operation of a stylus. GUIs may also display a web browser for point-and-click input operation. Network server 160 may provide profile data 252, rule data 254, and segment data 256 for use in a data quality management application (as further described with reference to FIGS. 4-9) that is displayed and executed on personal device 120 and/or controller 130. Based on user input or user interaction with the GUI, personal device 120 and/or controller 130 may transmit profile data 252, rule data 254, and segment data 256 to network server 160, from network 150 through I/O device 230, and may analyze such data to control and/or restrict variable and/or rule features and settings by modifying and configuring data quality management. Network server 160 may store a copy of profile data 252, rule data 254, and segment data 256, for example, in memory 240, database 260, or in any other database accessible to server 160. FIG. 3 is a schematic block diagram illustrating an exemplary controller 130, used in the exemplary system of FIG. 1.

As illustrated in FIG. 3, controller 360 may be capable of communicating with a transceiver 310, network 150, cloud platform 190, and personal devices 120. Transceiver 310 may be capable of receiving one or more data quality management instructions (further described with reference to FIGS. 4-9) from one or more personal devices 120 and/or cloud platform 190 over network 150. Transceiver 310 may be capable of transmitting profile data 352 from controller 360 to one or more personal devices 120 and/or cloud platform 190 over network 150. Controller 360 may transmit profile data 352, rule data 354, and segment data 356. This information may be stored in memory 340 and/or database 362. Controller 360 may include one or more processors 320, input/output 330, controller programs 344 and operating system 346. Controller 360 may function in a manner similar to network server 160 and may operate independently or cooperatively with network server 160. Controller 360 may be configured to receive data quality management instructions to control, send, and/or edit data quality management features and/or settings. The user-adjustable data feature settings may include at least one of a threshold, rule, score, or test features. Other data features and/or settings are contemplated. A user may monitor variable and data quality according to requests from one or more registered tracking users executing a data quality management application on personal device 120 and/or through a controller 130.

Controller 360 may function to include input according to rule data 354 based on one or more rules. A first set of applicable rules may automatically be generated based on extracted data elements and/or based on a plurality of data feature settings. Rule data 354 may include a null rule 370, range rule 372, uniqueness rule 374, valid value rule 376, or format rule 378. A consistency and conditional rule (not shown) may also be contemplated. Other data quality management features may be utilized based on the particular data being analyzed, as well as for a specific purpose for which the data is being analyzed.

Figure 4:
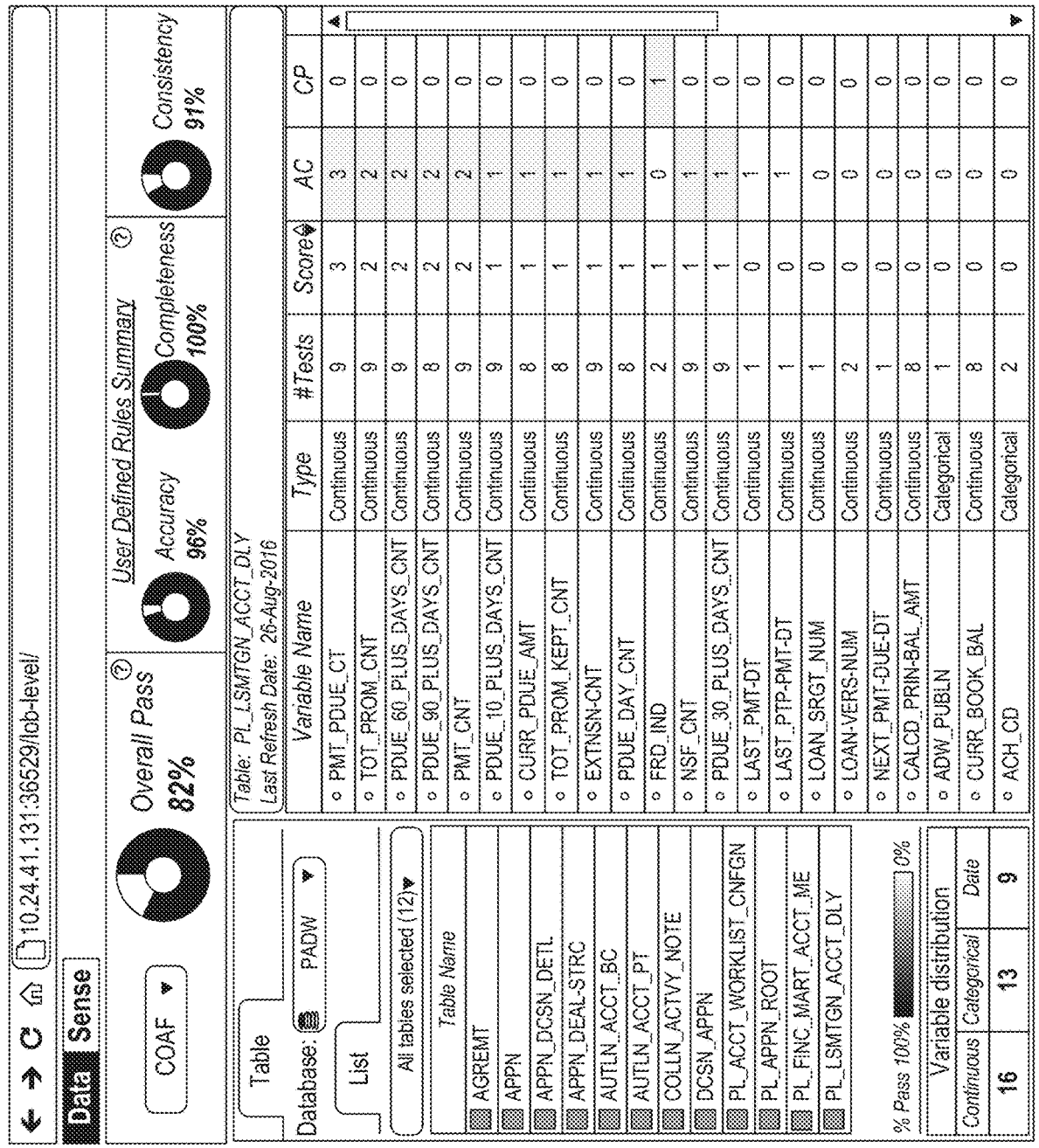
FIG. 4 is a diagrammatic illustration of an exemplary graphical user interface used for monitoring and configuring variables related to data quality management.

FIG. 4 is a diagrammatic illustration of an exemplary graphical user interface used for monitoring and configuring variables related to data quality management. GUI 400 may be displayed as part of a screen executed by an application on a personal device 120. Exemplary GUI 400 may include a "User Defined Rules Summary" or a "Statistical Rules Summary" to assess data quality including metrics and percentage assessments including, for example, "Overall Pass" and further divided in the rules categories of "Accuracy," "Completeness," and "Consistency." A "Table" may extract data from a particular "Database," and a list of "Variables" may be displayed for further exploration and monitoring by a tracking user according to a selected "Table." For example, in FIG. 4 the "Table" according to "PL_LSMTGN_ACCT_DLY" is selected, and variables such as "PMT_PDUE_CT" and "TOT_PROM_CNT" are displayed for analysis. The "Variables" may be organized and categorized according to "Variable Name," "Type," "# Tests," "Score," (for all the tests and "Score" for each category of rules), "AC (Accuracy)," and "CP (Completeness) and/or "CO (Consistency)."

The "results" may also be organized and categorized according to "Statistical Rule" categories including, for example, "FA (Frequency Anomaly)," "GS (General Statistics)" "OD (Outlier Detection), and "% MIS (Missing)." Each category may include a numerical value or ranking indicating an assessment of the variable. A score may be calculated to see how many tests a variable is failing, by what 'severity' it is failing the test, or a combination of these two, as well as the number of rows failing at least one test. Sorting and filtering features may also be incorporated to help the user prioritize elements to analyze, for example, elements with worse data quality first, based on using a chosen metric in "Score." A "Variable Distribution" may also be displayed. These data feature settings may be adjustable and customized according to the display preferences of a monitoring user. For example, a display scale can be changed between linear or logarithmic for "Variable Distribution." User-adjustable data feature settings may be provided as a tab, a slider, a drop-down menu, or a toggle. Other user-adjustable data feature settings and variable displays may be contemplated.

Figure 5:
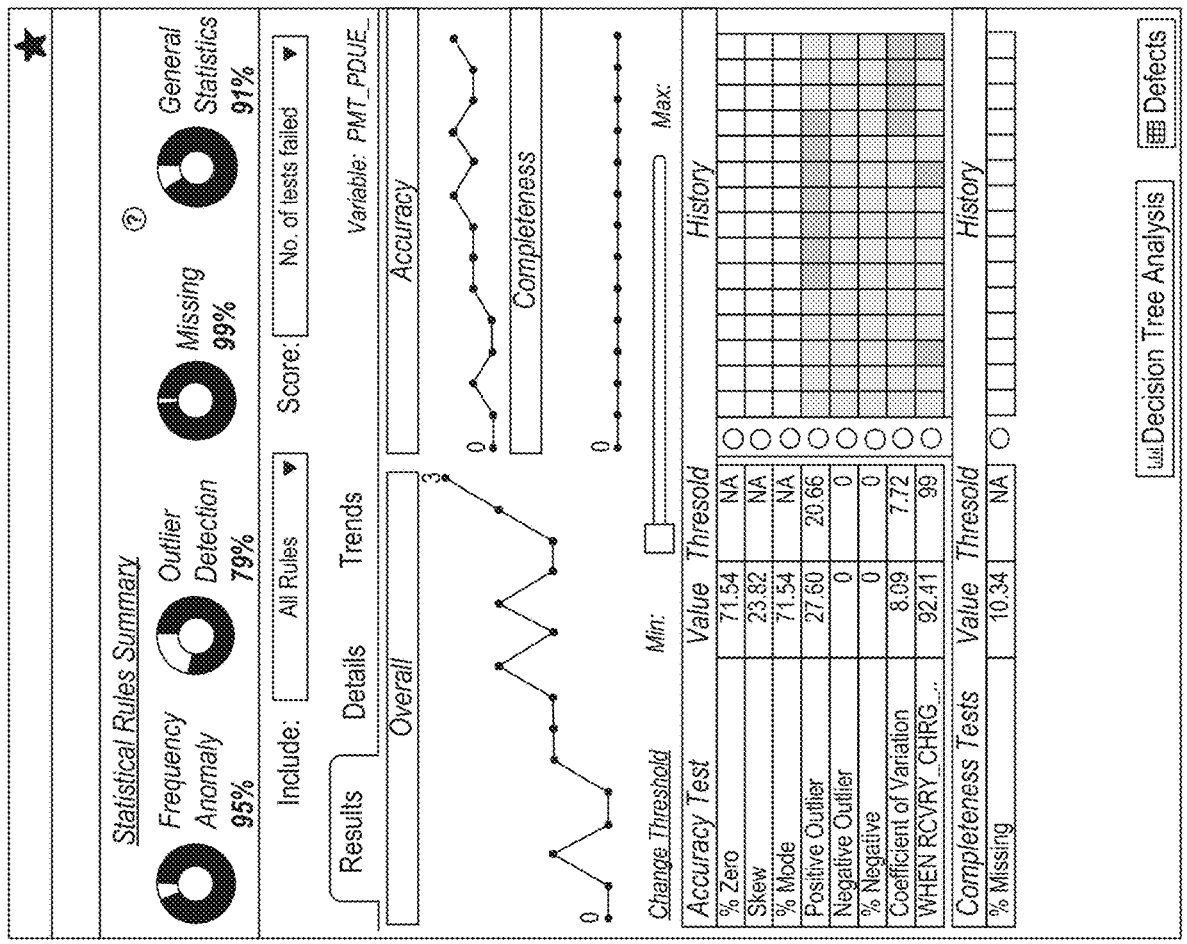
FIG. 5 is a diagrammatic illustration of an exemplary graphical user interface used for tracking results related to variable data quality.

FIG. 5 is a diagrammatic illustration of an exemplary graphical user interface 500 used for tracking results related to variable data quality. GUI 500 may be displayed as part of a screen executed by an application on a personal device 120. GUI 500 may include a "Statistical Rules Summary" including an assessment of "Frequency Anomaly," "Outlier Detection," "Missing," and "General Statistics" related to variable "PMT_PDUE." GUI 500 may include drop-down menus and other input fields (not shown) to analyze and/or summarize a selection of one or all rules related to this variable. For example, GUI 500 may allow a user to "Include" a summary of "All Rules" (or only user-defined or statistical rules) and may provide a "Score." Tabs for "Results," "Details," and "Trends" can be selected by a monitoring user. In FIG. 5, "Results" are displayed indicating tracking results related to rule data quality. These results are displayed in line graph and tabular form. The line graph may be representative of a summary of the data quality of the selected element. The tabular form may be representative of a listing down of all applicable rules for a selected element. User defined rules as well statistical rules may be displayed, and may illustrate rule performance in comparison with historical data. Other types of graphs and graphical forms of displaying data are contemplated. Also, "Accuracy," "Completeness," and "Consistency" can be assessed. A "Change Threshold" setting allows a monitoring user to change the threshold visible on the dashboard. (Further, a threshold suggestion based on historical data profile may be pre-populated.) Historical data for past cycles may also be displayed as relating to a selected one or more rules that may be automatically generated. Additionally, "Decision Tree Analysis" and "Defects" buttons may be included as buttons in the bottom right of the screen to open a separate GUI for display (as further described with reference to FIG. 9).

Figure 6:
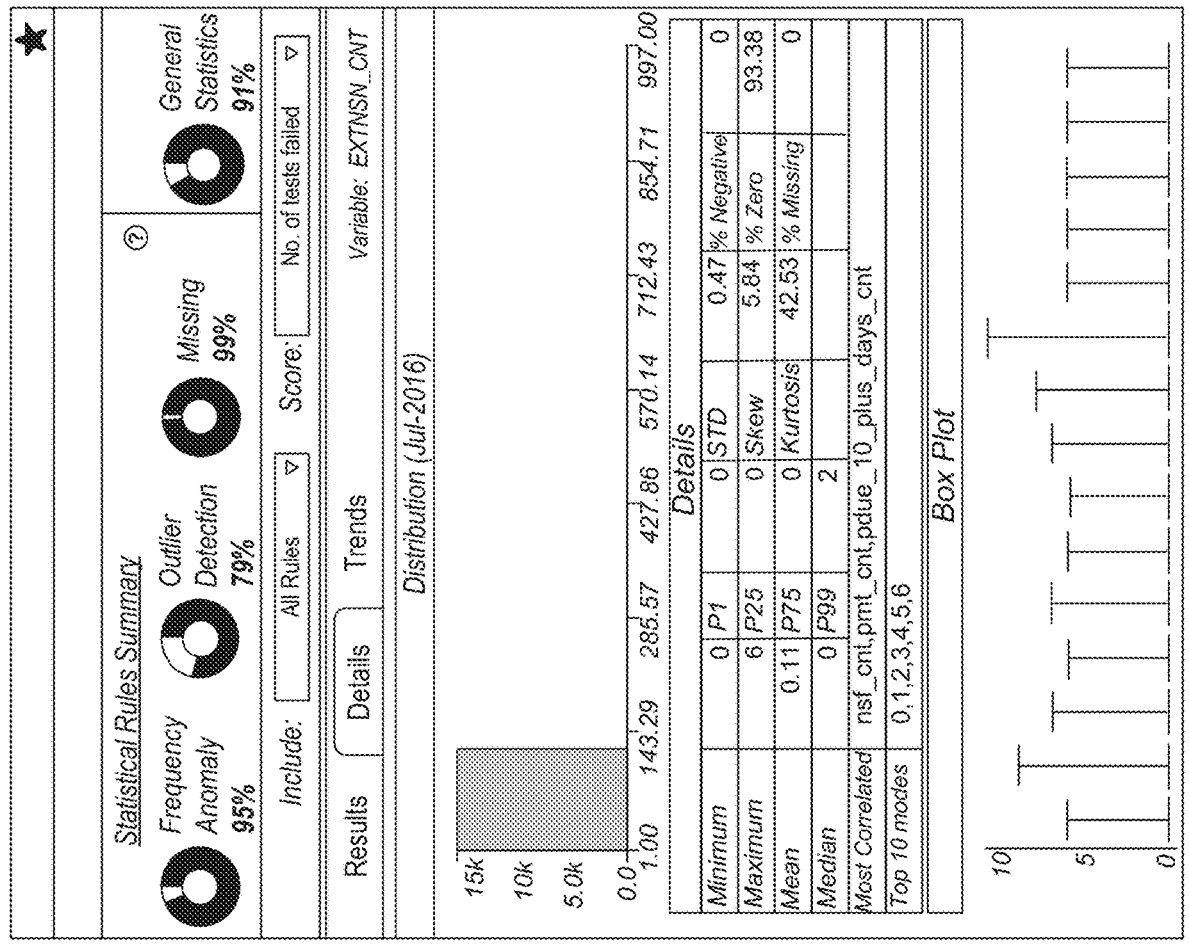
FIG. 6 is a diagrammatic illustration of an exemplary graphical user interface used for tracking details related to variable data quality.

FIG. 6 is a diagrammatic illustration of an exemplary graphical user interface 600 used for tracking details related to variable data quality. GUI 600 may be displayed as part of a screen executed by an application on a personal device 120. GUI 600 may include a "Statistical Rules Summary" including an assessment of "Frequency Anomaly," "Outlier Detection," "Missing," and "General Statistics" related to a different variable "EXTENSN_CNT." GUI 600 may include drop-down menus and other input fields (not shown) to analyze and/or summarize a selection of one or all rules related to this variable. For example, GUI 600 may allow a user to "Include" a summary of "All Rules" and may provide a "Score." Tabs for "Results," "Details," and "Trends" can be selected by a monitoring user. In FIG. 6, "Details" are displayed indicating tracking details related to an element data profile. These results are displayed in a vertical bar graph and tabular form. Other types of graphs and graphical forms of displaying data are contemplated. For example, a "Box Plot" may be shown to display the data distribution over time.

Figure 7:
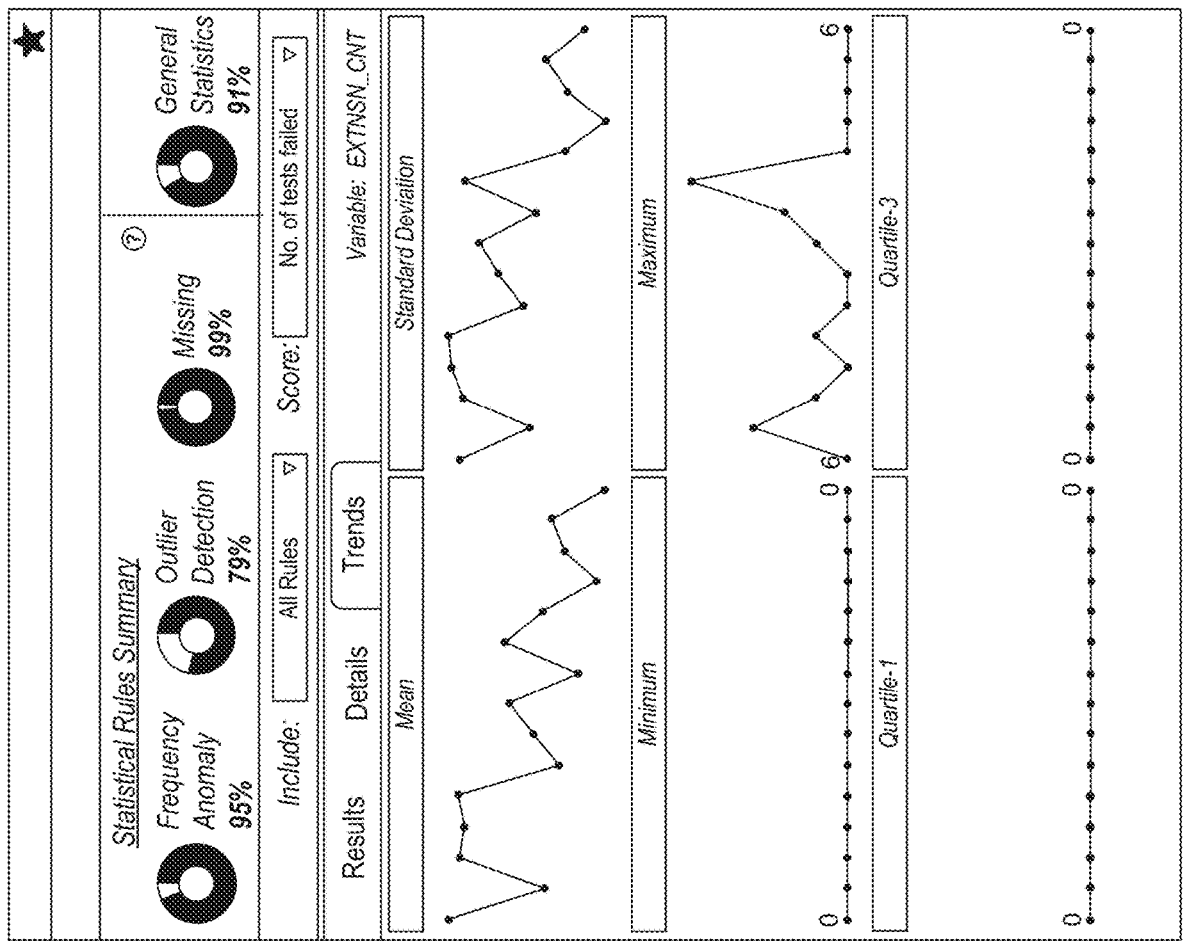
FIG. 7 is a diagrammatic illustration of an exemplary graphical user interface used for tracking trends related to variable data quality.

FIG. 7 is a diagrammatic illustration of an exemplary graphical user interface 700 used for tracking trends related to variable data quality. GUI 700 may be displayed as part of a screen executed by an application on a personal device 120. GUI 700 may include a "Statistical Rules Summary" including an assessment of "Frequency Anomaly," "Outlier Detection," "Missing," and "General Statistics" related to variable "EXTNSN_CNT." GUI 700 may include drop-down menus and other input fields (not shown) to analyze and/or summarize a selection of one or all rules related to this variable. For example, GUI 700 may allow a user to "Include" a summary of "All Rules" and may provide a "Score." Tabs for "Results," "Details," and "Trends" can be selected by a monitoring user. In FIG. 7, "Trends" are displayed indicating tracking trends related to rule data quality. These results are displayed in a line graph form. Other types of graphs and graphical forms of displaying data are contemplated.

Figure 8:
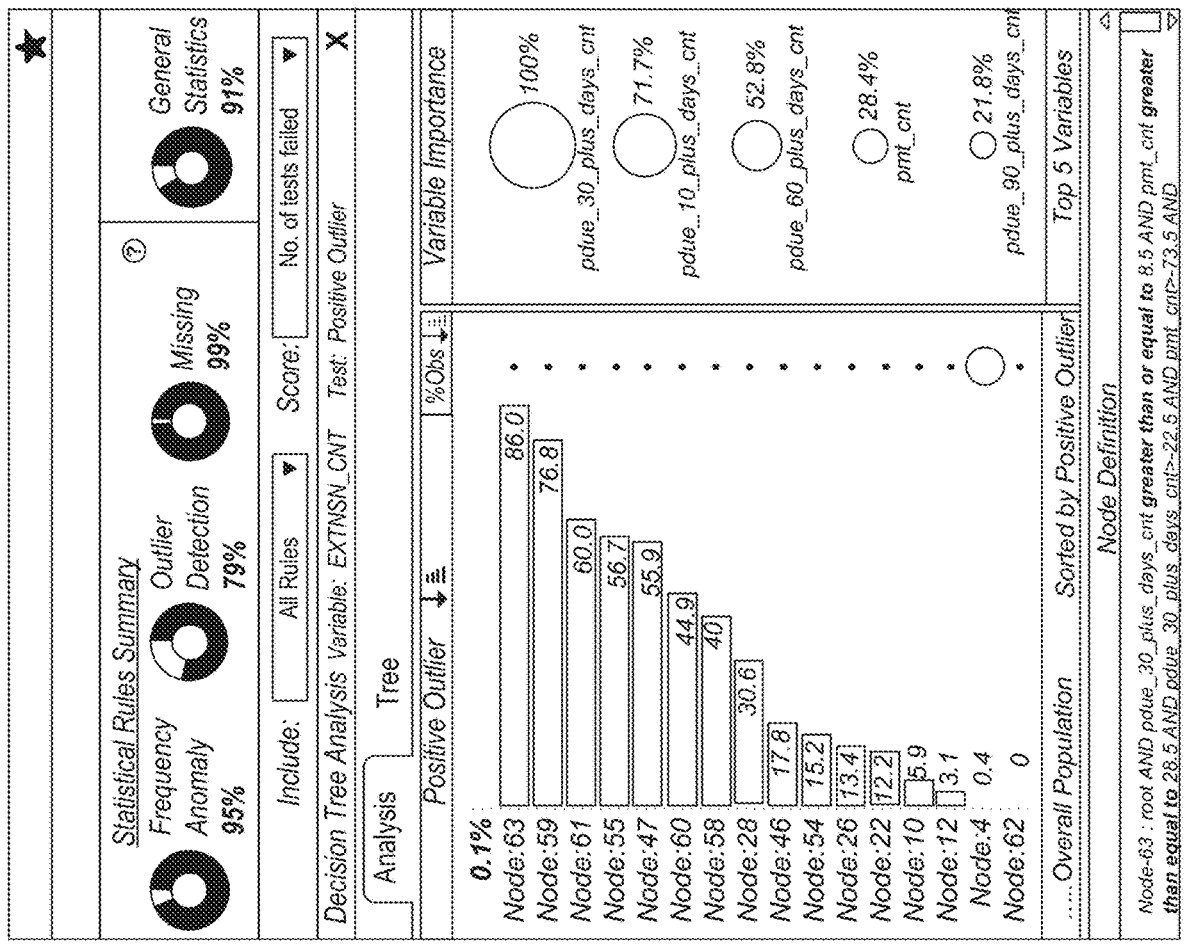
FIG. 8 is a diagrammatic illustration of an exemplary graphical user interface used for tracking decision analysis related to variable data quality.

FIG. 8 is a diagrammatic illustration of an exemplary graphical user interface 800 used for tracking decision tree analysis related to variable data quality. GUI 800 may be displayed as part of a screen executed by an application on a personal device 120. GUI 800 may include a "Statistical Rules Summary" including an assessment of "Frequency Anomaly," "Outlier Detection," "Missing," and "General Statistics" related to variable "EXTNSN_CNT." GUI 800 may include drop-down menus and other input fields (not shown) to analyze and/or summarize a selection of one or all rules related to this variable. For example, GUI 800 may allow a user to "Include" a summary of "All Rules" and may provide a "Score." Tabs for "Analysis" and "Tree" can be selected by a monitoring user. In FIG. 8, the tab for "Analysis" is displayed indicating analysis related to rule data quality. This "Analysis" is displayed in a horizontal bar graph and corresponds to a "Positive Outlier" test of multiple data nodes. All clusters (segments) derived from the decision tree analysis may be displayed. A bar graph may be sorted according to the cluster having the most "defects' or the most observations. A "Node Definition" may be the definition of the segment. Further, a "Node Definition" may be displayed for a monitoring user. GUI 800 may also display a contiguous panel of "Variable Importance" assessing and displaying in percentage and graphical terms the "Top 5 Variables." The "Top 5 Variables" are the variables identified as important in defining multivariate clusters. Display of this information may aid users in performing further analysis). Other types of graphs and graphical forms of displaying data are contemplated.

Figure 9:
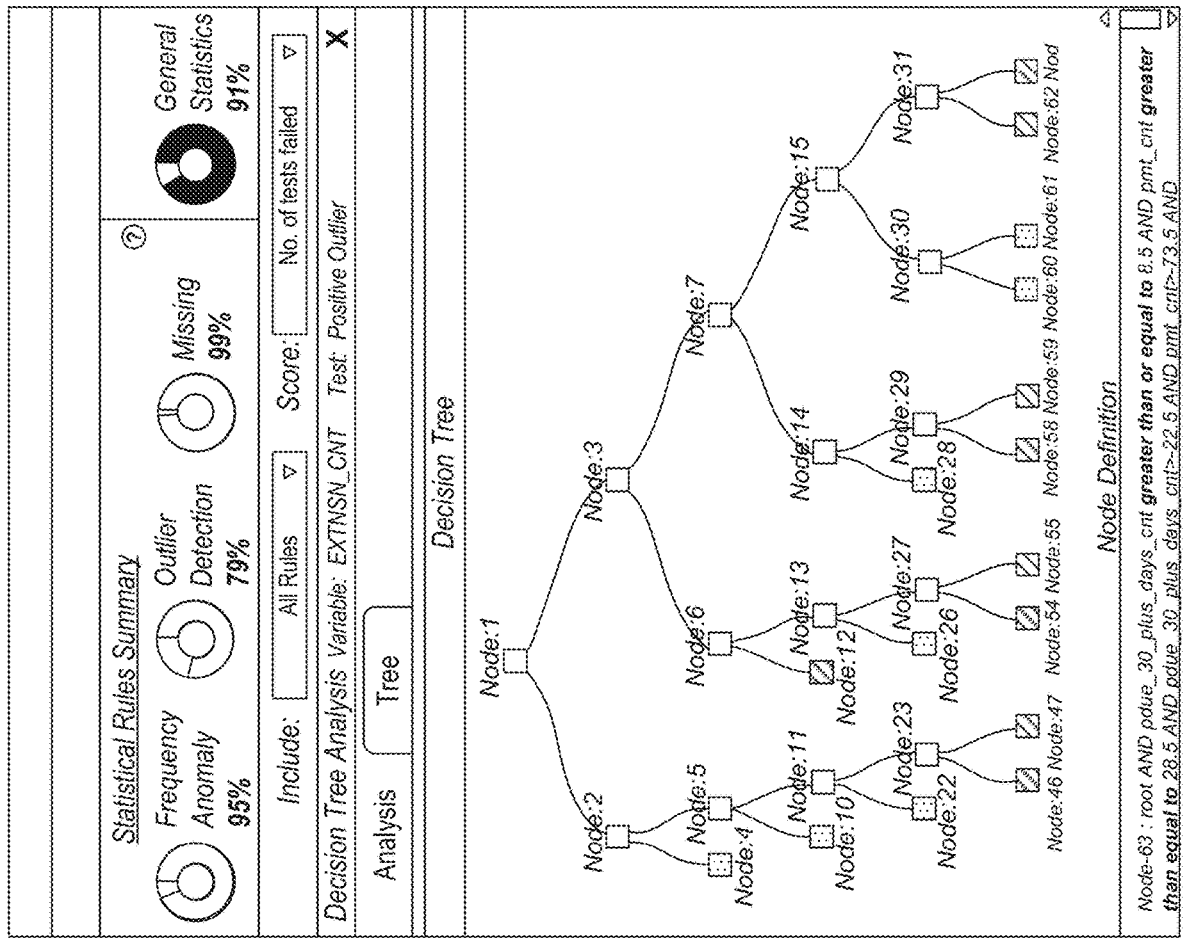
FIG. 9 is a diagrammatic illustration of an exemplary graphical user interface used for tracking a decision tree related to variable data quality.

FIG. 9 is a diagrammatic illustration of an exemplary graphical user interface 900 used for tracking a decision tree related to variable data quality. GUI 900 may be displayed as part of a screen executed by an application on a personal device 120. GUI 900 may include a "Statistical Rules Summary" including an assessment of "Frequency Anomaly," "Outlier Detection," "Missing," and "General Statistics," related to variable "EXTNSN_CNT." GUI 900 may include drop down menus and other input fields (not shown) to analyze and/or summarize a selection of one or all rules related to this variable. For example, GUI 900 may allow to "Include" a summary of "All Rules" and may provide a "Score." Tabs for "Analysis" and "Tree" can be selected by a monitoring user. In FIG. 9, the tab for "Tree" is displayed indicating a decision tree analysis related to rule data quality. This "Tree" is displayed as a segmentation tree and corresponds to a "Positive Outlier" test of multiple data nodes. A "Node Definition" may be displayed for understanding how the segment is defined. Other types of graphs and graphical forms of displaying data are contemplated.

Figure 10:
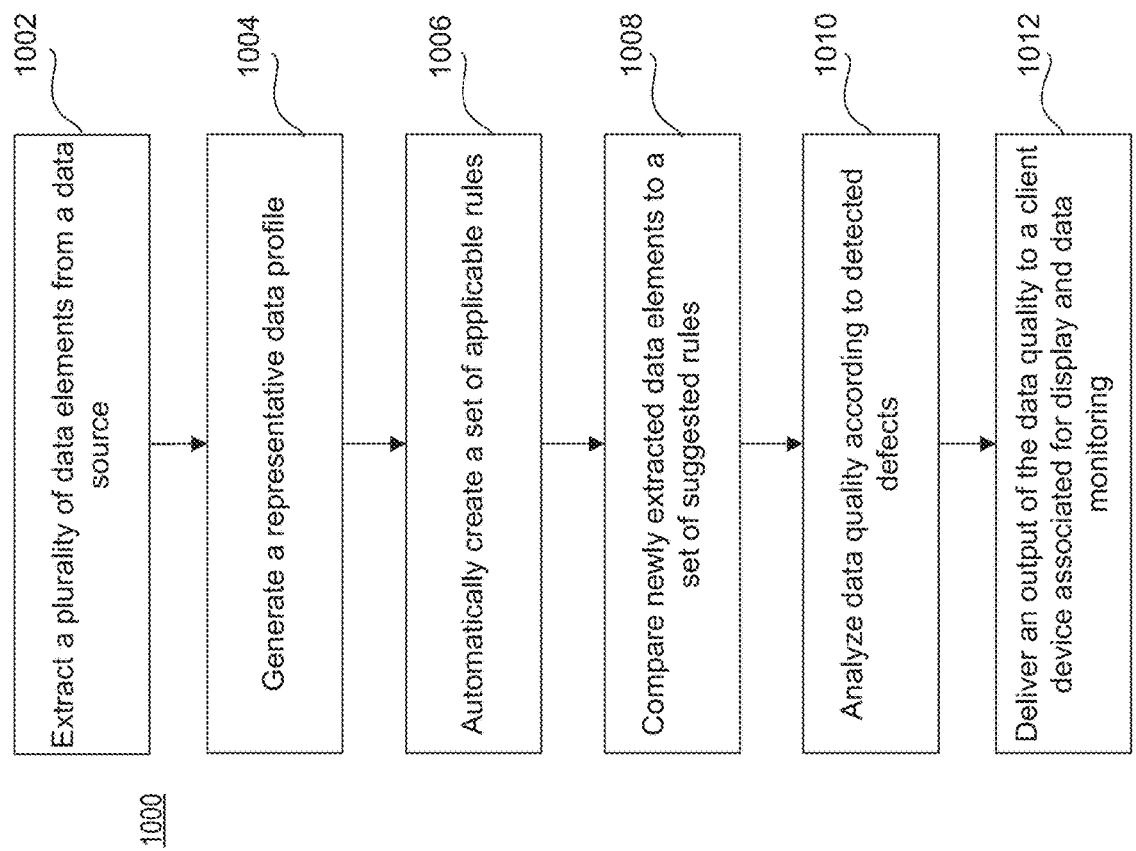
FIG. 10 is a flow chart illustrating an exemplary process performed by the system in FIG. 1, consistent with the disclosed embodiments.

FIG. 10 is a flow chart illustrating an exemplary process 1000 that one or more processors may perform in accordance with the disclosed embodiments. While process 1000 is described herein as a series of steps, it is to be understood that the order of the steps may vary in other implementations. In particular, steps may be performed in any order, or in parallel.

At step 1002, process 1000 may include extracting a plurality of data elements from a data source. Data elements may be pulled from a data sources automatically or may be uploaded from an existing software program. Process 1000 may include parsing a plurality of data elements according to an alphanumeric identifier or a data list from the data source. Extraction may occur at an individual data set level, and may also occur at broader levels for large object (LOB) data. Data may include historical data and/or metadata. Data sources may include Teradata™, SAS™, SQL Server™, Oracle™ or other sources of data including cloud-based file systems such as Amazon™ Simple Storage Service (Amazon™ S3). Other extracting mechanisms and/or data sources are contemplated.

At step 1004, process 1000 may include generating a representative data profile based on the extracted data elements. The generating of profile data 252 may be based on historical data and metadata, and according to an algorithm or server programs 244. The generating may be executed automatically according to network server 160 or processor 220 interaction with cloud platform 190. A preliminary analysis may also be conducted by a monitoring user according to descriptive statistics or displayed data in order to provide user adjustable input and/or features to provide additional instructions to establish a representative data profile.

At step 1006, process 1000 may automatically create a first set of applicable rules based on the extracted data elements and the representative data profile, wherein the first set of applicable rules assesses data quality according to a determined threshold. The threshold may be determined by a monitoring user as illustrated in FIG. 5. Alternatively, a threshold may be determined automatically based on previously extracted data elements and representative data profile generated based on the previously extracted data elements. The threshold may define criteria for acceptable or unacceptable data quality.

A machine learning algorithm may be implemented in order to suggest a set of rules using parts of data element names as input. The algorithm may learn from data (and previously defined rules) describing the relationship between element names and existing rules to predict rules for new data elements. Rules may also be mapped where rules exist together. A representative data profile of an element may be used to refine a rule list. The representative data profile may check applicability of rule and may suggest more rules. For example, the data profile may conduct a format check to determine whether a ZIP code adheres to a custom format of a 5-, 9-, or 11-digit integer. Processor 220 may be configured to automatically create additional rules for additional extracted data elements. Processor 220 may also be further configured to define a conditional rule by identifying subpopulations, historical data, and contingent relationships between the extracted data elements. Codes may be automatically generated for rules. Additionally, as users accept, reject, or adjust a rule as mentioned, that decision may be considered as an input and utilized in further refining the rules suggestion or second set of suggest rules.

A rule may comprise at least one of a support value, a confidence value, or a lift ratio. The support value of a rule may be defined as the proportion of transactions in the database which contains the item-set. The confidence value of a rule, $X \rightarrow Y$ may be the proportion of transactions that contain X which also contains Y. The lift ratio of the observed support may be that expected if X and Y were independent. Minimum support, confidence, and lift values may be predetermined. A rule may also comprise at least one of a null rule, a range rule, a uniqueness rule, a valid value rule, a format rule, a conditional rule, or a consistency rule. A null rule may be contemplated for all variables, and a null rule check may be suggested, when calculated by the data quality management system/tool, if an Upper limit (UL) for data is lower than 1% for a % of missing data. A range rule may apply to continuous variables, and a Range may be defined as a Lower limit of P0.5 (LL(P0.5)) to Upper limit of P99.5 (UL(P99.5)). A uniqueness rule may apply to all variables except time-stamp, decimal, and descriptive variables, and uniqueness rule may be proposed if 98% of the values in the variable are unique. A valid value rule may apply to categorical variables, and allowed valid values may be determined. This method may look at existing values in the categorical variable and the percentage of elements with each value to determine whether valid value rules should be suggested. A format rule may apply for all variables, and may assess a quality of the format of data. Other rule types and/or formats may be contemplated. For example, a conditional rule (if A then B) may flag accounts as defective if a variable is missing, and a consistency rule may include a mathematical or correlational check (e.g. $A=B+C$ where A, B, and C are variables). Consistency rule may include consistency across multiple data elements, and may define data element relevance and relation according to an algorithm and/or business related routine. Rule data 254 may describe the rule and may be derived according to profile data 252.

At step 1008, process 1000 may include assessing newly extracted data elements based on a comparison of the newly extracted data elements to the second set of suggested rules. Rules may be generated automatically and also may be monitored by users prior to their application to additional data sets. Once approved by a user, new rules may be automatically applied to extracted data on a periodic basis and may indicate based on a determined threshold whether a data element is of acceptable quality for use by an organization, and whether or not it passes or fails. The comparison may include an identification of data defects determined by processor 220 or network server 160. Further, user actions may also operate as an input to the rule suggestion framework and may further refines rule suggestion. The process may further include clustering the assessed data elements into multiple segments according to detected defects detected in the assessed data elements. Based on the rules application, defects may be triggered. Identification of data defects may be collated, and a data quality score may be assigned to an element, whether or not the data possesses any defects (as further referenced in FIGS. 5-9). Based on an assigned score or ranking, a data element may be classified or categorized as either possessing failing or passing data quality. Based on this classification, data elements may be clustered or segments. Clustering of data may also include more than two classifications.

At step 1010, process 1000 may analyze data quality corresponding to defects detected in the assessed data elements. A decision tree algorithm from a comprehensive platform or from a third-party tool may be used to find pockets of defect concentration (as illustrated in FIG. 9). A defect may be defined as an event, and a population of data may be divided into multivariate subpopulations based on an event rate or concentration of defects. The data may be isolated and analyzed according to detected defects. Curated settings adjusted by a user may be used to identify nodes with a large concentration of defects (as illustrated in FIG. 9). In a tool, a user can select the type of defect on which he or she wants to do further analysis, and can generate the list of defects on a click of a button. Based on identification and analysis of data, data can be further clustered, segmented, and used to provide an overall assessment of data health. Additionally, data with defects can be disregarded.

At step 1012, process 1000 may deliver an output of the data quality to a personal device associated for display and data monitoring by a user. A summary dashboard may be generated (as referenced in FIGS. 4-9) to display data quality results on an ongoing basis. The dashboard may be displayed as part of a web browser, and may be displayed as part of an application executed on a personal device 120. Results, details, and trends may be displayed in a graphical user interface. Additionally, historical results may be displayed. Monitoring of existing data may be compared with historical runs. An element's summary statistics may also be displayed to help in monitoring any sudden change in the data quality metrics of one or more data elements. The dashboard may integrate data quality results of multiple data tables and datasets into one singular view and summarize "Data Health" for a group of datasets at an LOB level or at a Database level. "Data Health" may be defined as percentage of elements passing all the tests by all the variables at a particular grouping level.

FIG. 11 is a flow chart illustrating another exemplary process 1100 that one or more processors may perform in accordance with the disclosed embodiments. While the exemplary process 1100 is described herein as a series of steps, it is to be understood that the order of the steps may vary in other implementations. In particular, steps may be performed in any order, or in parallel.

At step 1102, process 1100 may include providing a plurality of user-adjustable data feature settings to a user. The user-adjustable data feature settings may be provided as a tab, a slider, a drop-down menu, or a toggle. The user-adjustable data feature settings may include at least one of a variable, a threshold, a rule, a score, or a test. A graphical user interface (GUI) as described (with reference to FIGS. 4-9) may include a plurality of user-adjustable data feature settings. Other user-adjustable data feature settings (not shown) may be contemplated.

At step 1104, process 1100 may include detecting a user interaction modifying the user-adjustable data feature settings. A detection may include one or more pressure sensors detecting a user's finger pressing on a user interface panel of a personal device 120. A detection may also include processor 220 detecting a change in a selection of the user-adjustable data feature settings. For example, a change in selection of a drop-down menu or slider may indicate that user-adjustable features have been modified according to a variable and/or rule. Other detection mechanisms may be contemplated.

At step 1106, process 1100 may include determining customized data feature settings based on historical user interaction. For example, GUI data 256 may be stored as representative of customized user preferences for monitoring users. GUI data 256 may be associated with profile data 252 and rule data 254. GUI data 256 may be customized according to user, profile, rule, variable, cluster defect segmentation, and/or additional categories. Capturing of user selection/customization of rules over time to may also allow for better organizational recommendations. Other customized data feature settings may be contemplated.

At step 1108, process 1100 may include automatically creating a first set of applicable rules based on the customized data feature settings. Codes may be automatically generated for rules. Automatic creation of the first set of applicable rules may be associated with representative data profile, historical data, and metadata, and processors 220 may be configured to store the representative data profile, historical data, and metadata in a cloud network. An automatically created first set of applicable rules rule may assess data quality according to a determined threshold. The threshold may be determined by a monitoring user as illustrated in FIG. 5. Alternatively, a threshold may be determined automatically based a previously extracted data elements and the representative data profile. The threshold may define criteria for acceptable or unacceptable data quality. Processor 220 may be configured to define a conditional rule by identifying subpopulations, historical data, and contingent relationships between the extracted data elements. A rule may also comprise at least one of a null rule, a range rule, a uniqueness rule, a valid value rule, a conditional rule, or a consistency rule. Other rule types and/or formats may be contemplated.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for providing data quality management, the system comprising:
    at least one memory storing instructions; and
    at least one processor connected to a network and executing the instructions to perform operations comprising:
        extracting a plurality of first data elements from a data source;
        generating a data profile based on the first data elements;
        creating, by a machine learning algorithm and based on a property of the first data elements, a first set of rules for assessing data quality of the first data elements;
        generating a second set of rules based on the first data elements and the first set of rules;
        extracting a plurality of second data elements;
        assessing the second data elements based on a comparison of the second data elements to the second set of rules;
        detecting a plurality of defects based on the comparison, at least one of the detected defects including an event;
        determining, using a decision tree algorithm, data quality according to the detected defects, the data quality comprising a pocket of defect concentration; and
        transmitting instructions, to a client device, to display a representation of the determined pocket of defect concentration in a user interface of the client device.

2. The system of claim 1, wherein creating the first set of rules comprises:
    creating the first set of rules, based on at least a portion of a name of the first data elements.

3. The system of claim 1, wherein creating the first set of rules comprises:
    creating the first set of rules, based on a result of a formality check of at least one of the first data elements.

4. The system of claim 1, wherein the operations further comprise:

clustering the assessed second data elements into multiple segments based on the detected defects.

5. The system of claim 1, wherein extracting the first data elements comprises parsing the first data elements according to at least one of an alphanumeric identifier or a data list from the data source.

6. The system of claim 1, wherein generating the data profile comprises:
receiving user input; and
generating the data profile based on the received user input and the first data elements.

7. The system of claim 1, wherein the generated data profile comprises at least one of organizational information, authentication timestamp information, network node location, network node preference, access point location, or access point preference.

8. The system of claim 1, wherein generating the second set of rules comprises generating the second set of rules based on a user input for adjusting the first set of rules.

9. The system of claim 1, wherein the second set of rules comprises a framework criteria comprising at least one of a support value, a confidence value, or a lift ratio.

10. The system of claim 1, wherein the first set of rules comprises at least one of a null rule, a range rule, a uniqueness rule, a valid value rule, a format rule, a conditional rule, or a consistency rule.

11. A system for providing data quality management, the system comprising:
at least one memory storing instructions; and
at least one processor connected to a network and executing the instructions to perform operations comprising:
extracting a plurality of first data elements from a data source;
generating a data profile based on the first data elements;
creating, by a machine learning algorithm and based on the first data elements, a first set of rules for assessing data quality of the first data elements;
generating a second set of rules based on the first data elements and the first set of rules;
extracting a plurality of second data elements;
assessing the second data elements based on a comparison of the second data elements to the second set of rules;
detecting a plurality of defects based on the comparison, at least one of the detected defects including an event;
determining, using a decision tree algorithm, data quality according to the detected defects, the data quality comprising a pocket of defect concentration; and
transmitting, to a client device, instructions to display a representation of the determined pocket of defect concentration in a user interface of the client device.

12. The system of claim 11, wherein creating the first set of rules comprises:
creating a first preliminary set of rules, based on at least a portion of a name of the first data elements; and
creating the first set of rules by refining the preliminary set of rules based on a user input.

13. The system of claim 11, wherein the operations further comprise:
clustering the assessed second data elements into multiple segments based on the detected defects.

14. The system of claim 11, wherein extracting the first data elements comprises parsing the first data elements according to at least one of an alphanumeric identifier or a data list from the data source.

15. The system of claim 11, wherein generating the data profile comprises:
receiving user input; and
generating the data profile based on the received user input and the first data elements.

16. The system of claim 11, wherein the generated data profile comprises at least one of organizational information, authentication timestamp information, network node location, network node preference, access point location, or access point preference.

17. The system of claim 11, wherein generating the second set of rules comprises generating the second set of rules based on a user input for adjusting the first set of rules.

18. The system of claim 11, wherein the second set of rules comprises a framework criteria comprising at least one of a support value, a confidence value, or a lift ratio.

19. The system of claim 11, wherein the first set of rules comprises at least one of a null rule, a range rule, a uniqueness rule, a valid value rule, a format rule, a conditional rule, or a consistency rule.

20. A system for providing data quality management, the system comprising:
at least one memory storing instructions; and
at least one processor connected to a network and executing the instructions to perform operations comprising:
extracting a plurality of first data elements from a data source;
generating a data profile based on the first data elements;
creating, by a machine learning algorithm and based on the first data elements, a first set of rules for assessing data quality of the first data elements according to a threshold;
generating a second set of rules based on the first data elements and the first set of rules;
extracting a plurality of second data elements;
assessing the second data elements based on a comparison of the second data elements to the second set of rules;
detecting a plurality of defects based on the comparison, at least one of the detected defects including an event;
determining, using a decision tree algorithm, data quality according to the detected defects, the data quality comprising a pocket of defect concentration; and
transmitting, to a client device, instructions to display a representation of the determined pocket of defect concentration in a user interface of the client device.

* * * * *